United States Patent [19]
Sobottke et al.

[11] Patent Number: 5,479,431
[45] Date of Patent: Dec. 26, 1995

[54] SOLID-STATE LASER WITH ACTIVE ETALON AND METHOD THEREFOR

[75] Inventors: Mark D. Sobottke, Kettering; Daniel R. Klemer, Dayton, both of Ohio

[73] Assignee: Spectra-Physics Laserplane, Inc., Dayton, Ohio

[21] Appl. No.: 252,949

[22] Filed: Jun. 2, 1994

[51] Int. Cl.$^6$ ................................................. H01S 3/08
[52] U.S. Cl. ................................ 372/92; 372/98; 372/21; 372/99
[58] Field of Search ........................... 372/92, 98, 99, 372/21, 22

[56] References Cited

U.S. PATENT DOCUMENTS

| | | |
|---|---|---|
| 3,949,323 | 4/1976 | Bierlein et al. . |
| 3,982,201 | 9/1976 | Rosenkrantz et al. . |
| 4,035,742 | 7/1977 | Schiffner . |
| 4,272,733 | 6/1981 | Walling et al. . |
| 4,383,318 | 5/1983 | Barry et al. . |
| 4,387,297 | 6/1983 | Swartz et al. . |
| 4,413,342 | 11/1983 | Cohen et al. . |
| 4,553,238 | 11/1985 | Shaw et al. . |
| 4,617,666 | 10/1986 | Liu . |
| 4,618,957 | 10/1986 | Liu . |
| 4,637,026 | 1/1987 | Liu . |
| 4,653,056 | 3/1987 | Baer et al. . |
| 4,656,635 | 4/1987 | Baer et al. . |
| 4,665,529 | 5/1987 | Baer et al. . |
| 4,701,929 | 10/1987 | Baer et al. . |
| 4,723,257 | 2/1988 | Baer et al. . |
| 4,730,335 | 3/1988 | Clark et al. . |
| 4,731,787 | 3/1988 | Fan et al. . |
| 4,731,795 | 3/1988 | Clark et al. . |
| 4,739,507 | 4/1988 | Byer et al. . |
| 4,756,003 | 7/1988 | Baer et al. . |
| 4,761,786 | 8/1988 | Baer . |
| 4,871,235 | 10/1989 | Greene et al. ............... 372/21 |
| 4,884,281 | 11/1989 | Hawthorn et al. . |
| 4,930,131 | 5/1990 | Sizer, II ........................ 372/18 |
| 5,128,798 | 7/1992 | Bowen et al. . |
| 5,164,947 | 11/1992 | Lukas et al. . |
| 5,187,714 | 2/1993 | Okazaki et al. ............. 372/22 |
| 5,287,381 | 2/1994 | Hyuga et al. ............... 372/21 |
| 5,295,146 | 3/1994 | Gavrilovic et al. ......... 372/21 |

OTHER PUBLICATIONS

Culshaw et al., "Efficient Frequency–Doubled Single–Frequency Nd: YAG Laser", *IEEE Journal of Quantum Electronics*, vol. QE–10, No. 2, Feb. 1974, pp. 253–263.

Smith, Richard G., "Theory of Intracavity Optical Second–Harmonic Generation", *IEEE Journal of Quantum Electronics*, vo. Qe–6, No. 4, Apr. 1970, pp. 215–223.

Yarborough et al, "Enhancement of Optical Second Harmonic Generation by Utilizing the Dispersion of Air", *Applied Physics Letters*, vol. 18, No. 3, Feb. 1, 1971, pp. 70–73.

Oka et al, "Stable intracavity doubling of orthogonal lineraly polarized modes in diode–pumped ND: YAG lasers", *Optics Letters*, vol. 13, No. 10, Oct. 1988, pp. 805–807.

(List continued on next page.)

*Primary Examiner*—Leon Scott, Jr.
*Attorney, Agent, or Firm*—Killworth, Gottman, Hagan & Schaeff

[57] ABSTRACT

An active etalon comprising a laser gain chip interposed between an input mirror and an etalon end mirror is provided. In an intracavity frequency-doubled solid-state laser, a pump source emits pump radiation which passes through the input mirror and into the laser gain chip. The laser gain chip lases in response to the pump radiation to produce fundamental laser light. The etalon end mirror reflects a portion of the fundamental laser light back into the laser gain chip and transmits the remaining portion of the fundamental laser light into the laser cavity. The input mirror reflects substantially all of the fundamental laser light into the laser gain chip. The portion of the fundamental laser light which passes through the etalon end mirror may be frequency doubled by a frequency doubler chip and a portion thereof transmitted through the front end of the laser cavity to form the output laser beam.

16 Claims, 2 Drawing Sheets

OTHER PUBLICATIONS

James et al, "Intermittency and chaos in intracavity doubled lasers", *Physical Review A*, vol. 41, No. 5, Mar. 1, 1990, pp. 2778–2790.

Chinn et al, "Low–Threshold, Transversely Excited NdP5014 Laser", *IEEE Journal of Quantum Electronics*, Sep. 1975, pp. 747–754.

Budin et al, "On the Design of Neodymium Miniature Lasers", *IEEE Journal of Quantum Electronics*, vol. QE–14, No. 11, Nov. 1978, pp. 831–839.

Budin et al, "Miniature Nd–pentaphosphate laser with bonded mirrors side pumped with low–current density LED's", *Appl. Phys. Lett.* 33(4), Aug. 15, 1978, pp. 309–310.

Kubodera et al, "Stable LiNdP4012 miniature laser", *Applied Optics*, vol. 18, No. 6, Mar. 15, 1979, pp. 884–890.

Weber et al, "Nd–ultraphosphate laser", *Appl. Phys. Letters*, vol. 22, No. 15, May 15, 1973, pp. 534–536.

Owyoung et al, "Gain switching of a monolithic single–frequency laser–diode–excited Nd: YAG laser", *Optics Letters*, vol. 10, No. 10, Oct. 1985, pp. 484–486.

Kubodera et al, "Spike–Mode Oscillations in Laser–Diode Pumped LiNdP4012 Lasers", *IEEE Journal of Quantum Electronics*, vol. QE–17, No. 6, Jun. 1981, pp. 1139–1144.

Chinn, S. R., "Intracavity second–harmonic generation in a Nd pentaphosphate laser", *Appl. Phys. Lett.*, vol. 29, No. 3, Aug. 1, 1976, pp. 176–179.

Chesler et al, "Miniature diode–pumped Nd: YIAG lasers", *Appl. Phys. Lett.*, vol. 23, No. 5, Sep. 1, 1973, pp. 236–236.

Barnes, "Diode–pumped solid–state lasers", *J. Appl. Phys.*, vol. 44, No. 1, Jan. 1, 1973, pp. 230–237.

Ostermayer, Jr., "GaAs1–zPz Diode Pumped YAG:Nd lasers", *Appl. Phys. Lett.*, vol. 18, No. 3, Feb. 1, 1971, pp. 93–96.

Allen et al, "Continuous Operation of a YAIG:Nd Laser by Injection Luminescent Pumping", *Appl. Phys. Lett.*, vol. 14, No. 6, Mar. 15, 1969, pp. 188–190.

Schmitt et al, "Diode–laser–pumped Nd:YAG laser injection seeding system", *Applied Optics*, vol. 25, No. 5, Mar. 1, 1986, pp. 629–633.

Baer, T., "Diode Laser Pumping of Solid–State Lasers", Reprint from *Laser Focus*, Jun. 1986.

Farmer et al, "Solid State Pumping Source for Nd:YAG Lasers with Integrated Focusing Optics", IBM Technical Disclosure Bulletin, vol. 15, No. 1, Jun. 1972, pp. 149–150.

Semiconductor Laser Specification Sheet, Toshiba Corporation, Feb. 9, 1987, 5 pages.

Data Sheet MOM–MM–163, "Cargille Meltmounts for Microscopy", Cargille Laboratories, Inc., Jan. 1, 1987, 2 pages.

Announcement Sheet, "CFE4 Spectroscopic properties and lasing of ND:GdVO4 pumped by a diode laser and a Ti:sapphire", Announced Feb. 1993.

Sorokin et al, "CW pasive mode–locking of a new ND3+:GdVo4 laser", ATuC2–1, Feb. 1993, pp. 203–205.

Ostroumov et al, "Nd:GdVO4 Crystal—a New Material for Diode–Pumped Solid–State Lasers", AMC1–1, Feb. 1993, pp. 52–54.

SOLID-STATE LASER WITH ACTIVE ETALON AND METHOD THEREFOR

BACKGROUND OF THE INVENTION

The present invention relates generally to solid-state lasers which utilize one or more etalons to control the frequency of the laser output and, more particularly, to a solid-state laser and method wherein an active etalon containing an active laser medium provides highly effective frequency filtering of the laser light, provides improved polarization and frequency stability of the laser light, provides improved efficiency of nonlinear conversion and provides improved modulation response of the laser.

A typical solid-state laser is capable of lasing in multiple longitudinal modes. The average frequency of these modes is determined primarily by the spectral gain distribution of the laser medium. Currently, laser oscillations are confined to a single longitudinal mode by inserting a pair of parallel reflective surfaces, known in combination as a Fabry-Perot etalon, between the front and back ends of the laser cavity to form a secondary resonant cavity. The etalon typically consists of a passive material, such as quartz, having parallel reflective surfaces.

The etalon is tilted with respect to the cavity axis such that reflections from the etalon do not interfere with the desired lasing radiation. At most wavelengths, the etalon reflects light out of the laser cavity, increasing cavity loss and suppressing laser oscillation. Light at certain wavelengths, however, experience interference effects which nullify the reflection, thus allowing laser oscillation. The frequency filtering function of an etalon is widely understood in the art and is described, for example, in *Optics*, Second Edition, by Eugene Hecht, Addison-Wesley Publishing Company 1987, at pages 368–371.

The etalon is designed to allow laser oscillation at wavelengths which are spaced far enough apart that only a single wavelength falls under the gain curve of the laser. Consequently, the laser oscillates at a single frequency. This oscillation frequency may be varied by turning the etalon in the laser cavity.

One common solid-state laser is the intracavity frequency-doubled laser which uses a frequency doubling medium to double the frequency of the laser light generated by the laser medium. The intracavity frequency-doubled solid-state laser is unfortunately prone to chaotic amplitude fluctuations due to nonlinear loss introduced by the intracavity frequency doubling medium. T. Baer, "*Large-amplitude fluctuations due to longitudinal mode coupling in diode-pumped intracavity-doubled Nd:YAG lasers*," J. Opt. Soc. Am. B, Vol. 3, September 1986, pp. 1175–1179. Large amplitude fluctuations due to longitudinal mode coupling are also experienced in diode-pumped intracavity doubled neodymium-doped yttrium aluminum garnet (YAG) lasers. In addition, variations in the index of refraction and the length of the doubling medium due to actual physical displacement of the medium or temperature fluctuations in the laser cavity can alter the polarization of the laser modes within the laser cavity. These unwanted changes in polarization decrease the conversion efficiency of the frequency doubling medium. The upper limit of frequency response of such lasers to direct modulation is a function of both the cavity decay rate and the level of pumping above threshold. With common solid-state laser systems, cavity decay rates are low, and threshold pump levels relatively high, allowing system performance to reach only several tens of kilohertz.

Accordingly, it is seen that a need exists in the art for a solid-state laser and method incorporating an active etalon which efficiently filters unwanted frequencies in the laser cavity, which improves the polarization and frequency stability of the laser light in the laser cavity, which improves the efficiency of nonlinear conversion in a frequency-doubled laser and which increases the modulation response of the laser.

SUMMARY OF THE INVENTION

An active etalon comprising a laser gain chip comprised of a solid-state gain medium interposed between two etalon mirrors provides improved frequency filtering, provides improved polarization and frequency stability of the lasing modes and provides increased efficiency of nonlinear conversion in a frequency-doubled solid-state laser. The laser gain chip lases in response to pump radiation which passes through the input mirror to produce fundamental laser light. The input mirror of the active etalon is substantially transparent to pump radiation and reflective of fundamental laser light. A portion of the fundamental laser light passes through the etalon end mirror and the remaining portion is reflected back into the laser gain chip. In a frequency-doubled laser, the portion of the fundamental laser light passing through the etalon end mirror is frequency doubled to produce second harmonic laser light which forms a portion of the laser output.

In accordance with one aspect of the present invention, an active etalon for generating fundamental laser light in response to pump radiation from a pump source is provided. The active etalon comprises an input reflector for receiving the pump radiation, for transmitting the pump radiation and for reflecting the fundamental laser light. A laser gain chip positioned adjacent the input reflector, generates the fundamental laser light in response to the pump radiation. The generated fundamental laser light is reflected by the input reflector into the laser gain chip which is preferably formed of neodymium-doped materials or neodymium stoichiometric materials.

An output reflector positioned adjacent the laser gain chip reflects the pump radiation into the laser gain chip, reflects at least a portion of the fundamental laser light into the laser gain chip and transmits the remaining portion of the fundamental laser light. The input reflector may comprise a reflective coating applied to a surface of the laser gain chip or an input mirror abutting the laser gain chip. Similarly, the output reflector comprises a partially reflective coating applied to a surface of the laser gain chip or an etalon end mirror abutting the laser gain chip.

In accordance with another aspect of the present invention, a solid-state laser for generating a laser beam comprises a laser cavity assembly for defining a laser cavity including a mirrored surface forming a front end of the laser cavity and a pump source for generating pump radiation and for transmitting the pump radiation into the laser cavity. A laser gain chip is positioned in the laser cavity for generating fundamental laser light in response to the pump radiation. Input reflector is positioned adjacent the laser gain chip for receiving the pump radiation, for transmitting the pump radiation into the laser gain chip and for reflecting the fundamental laser light into the laser gain chip. The output reflector positioned adjacent the laser gain chip reflects the pump radiation into the laser gain chip, reflects a portion of the fundamental laser light into the laser gain chip and transmits the remaining portion of the fundamental laser light.

The solid-state laser preferably further comprises a frequency multiplier for changing the frequency of the fundamental laser light which is transmitted through the output reflector to produce harmonic laser light. A portion of the harmonic laser light passes through the mirrored surface of the laser cavity to form the laser beam. The frequency multiplier may be a frequency doubler chip formed of potassium titanyl phosphate for doubling the frequency of the fundamental laser light.

In accordance with yet another aspect of the present invention, a method for generating laser light comprises the steps of: generating pump radiation; passing the pump radiation through an input mirror into a laser gain chip, the laser gain chip being positioned adjacent the input mirror; emitting the fundamental laser light from the laser gain chip in response to the pump radiation; reflecting the fundamental laser light into the laser gain chip by means of the input mirror; reflecting a portion of the fundamental laser light into the laser gain chip by means of an etalon end mirror positioned adjacent the laser gain chip; and passing the remaining portion of the fundamental laser light through the etalon end mirror.

The method preferably further comprises the step of doubling the frequency of the fundamental laser light which passes through the etalon end mirror by means of a frequency doubler chip to produce harmonic laser light. The step of passing the harmonic laser light through a cavity end mirror may also be included. The method may comprise the steps of: passing a portion of the harmonic laser light through a cavity end mirror and reflecting the remaining portion of the harmonic laser light from the cavity end mirror.

Accordingly, it is a feature of the present invention to provide an active etalon having a laser gain chip interposed between an input mirror and an etalon end mirror which provides for improved frequency filtering and improved frequency and polarization stability.

It is a further feature to provide a solid-state laser and method which incorporates an active etalon, thereby providing increased efficiency of nonlinear conversion in a frequency doubler chip and improved modulation response of the laser.

These and other features and advantages of the present invention will become apparent from the following detailed description, the accompanying drawings and the appended claims.

DETAILED DESCRIPTION OF THE INVENTION

Figure 1:
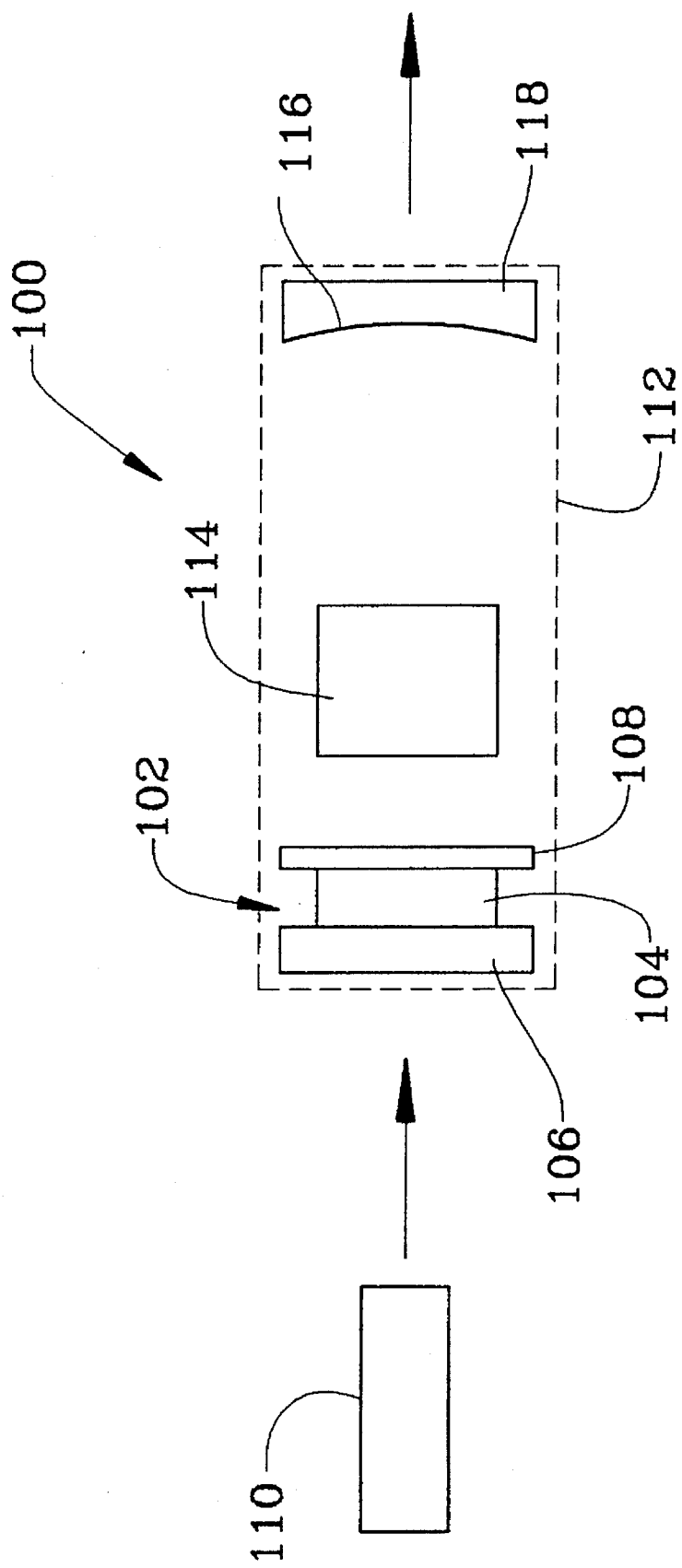
FIG. 1 is a schematic representation of a frequency-doubled solid-state laser having an active etalon comprising a lasing material interposed between an input mirror and an etalon end mirror in accordance with the present invention.

A schematic representation of a solid-state laser 100 having an active etalon 102 for generating fundamental laser light at a substantially constant wavelength is shown in FIG. 1. The active etalon 102 includes a laser gain chip 104 of any suitable lasing material, such as neodymium-doped or neodymium stoichiometric materials, interposed between an input reflector, shown as an input mirror 106, and an output reflector, shown as an etalon end mirror 108.

One skilled in the art will readily understand that the mirrors 106 and 108 may be replaced by reflective coatings having the appropriate reflectivity applied to the surfaces of the laser gain chip 104. In addition, those skilled in the art will readily comprehend that the input reflector and the output reflector may be immediately adjacent to the laser gain chip 104 or may be separated by a small distance from the laser gain chip 104. Furthermore, the input and output reflectors may be separated from the laser gain chip 104 by a substantially transparent material, such as glass. All of the aforesaid configurations should be considered within the scope of the present invention. For ease of description, the input and output reflectors will hereinafter be described as "adjacent the laser gain chip", which should be understood to include all of the above configurations.

During operation of the laser 100, a pump source 110, such as a laser diode, generates pump radiation and transmits the pump radiation into a laser cavity assembly for defining a laser cavity, generally designated by reference numeral 112. The pump radiation enters the laser cavity 112 and passes through the input mirror 106 into the laser gain chip 104. In response to the pump radiation, the laser gain chip 104 lases to emit fundamental laser light at a fundamental wavelength.

The fundamental laser light is emitted from the laser gain chip 104 in both directions in the laser cavity 112. The input mirror 106, which is transmissive of the pump radiation and reflective of the fundamental laser light, reflects the fundamental laser light into the laser gain chip 104. The etalon end mirror 108 is reflective of the pump radiation and partially reflective of the fundamental laser light. As described fully below, the reflectivity of the etalon end mirror 108 affects the performance of the active etalon 102. A portion of the fundamental laser light is reflected back into the laser gain chip 104 by the etalon end mirror 108. Frequency filtering derives from the etalon formed around the active medium, and light which is fed back into the laser medium from the active etalon mirrors tends to lock the laser radiation into the natural polarization state defined by the properties of the laser crystal, and to lock the frequency of radiation to that defined by the configuration of the active etalon. Thus, polarization and frequency stability result. The remaining portion of the fundamental laser light is emitted from the active etalon 102 through the etalon end mirror 108 into the laser cavity 112.

The frequency of the fundamental laser light emitted from the active etalon 102 may be changed by a frequency multiplier to produce harmonic laser light. Preferably, the frequency multiplier is a frequency doubler chip 114, which may be formed of potassium titanyl phosphate, for doubling the frequency of the fundamental laser light, thereby halving its wavelength.

At least a portion of the harmonic laser light passes through a mirrored surface 116 of a cavity end mirror 118 which defines the front end of the laser cavity 112 to form the laser output. The mirrored surface 116 reflects the fundamental laser light and may reflect a portion of the harmonic laser light. It has been found that reflecting a portion of the harmonic laser light back into the laser cavity 112 increases the efficiency of the laser 100. However, the reflected harmonic laser light must be controlled to constructively interfere with oppositely-propagating harmonic laser light in the laser cavity 112. A preferred laser design for controlling the phase of the harmonic laser light in the laser cavity is disclosed in concurrently-filed U.S. patent application Ser. No. 08/252,948 entitled "EFFICIENT LINEAR FREQUENCY DOUBLED SOLID-STATE LASER", (attorney's docket number SPC 188 PA) by Klemer et al., the disclosure of which is hereby incorporated by reference.

Moreover, it has been found that there is an optimum reflectivity for the etalon end mirror 108 of the active etalon 102 which produces the highest fundamental laser light output. For comparison purposes, a laser having front and back cavity end mirrors will first be considered. The output power $P_o$ can be described by the equation:

$$P_O = I_s A T \left( \frac{g_0 P_p}{L_i + (1-R)} - 1 \right) \quad (1)$$

wherein $I_s$ is the saturation intensity, A is the cross-sectional area of the laser mode, T is the transmission of the front cavity end mirror, $L_i$ represents the internal losses of the laser, and $g_o$ is a constant of the laser medium relating the small signal gain per pass to the input pump power, $P_p$. The reflectivity of the front cavity end mirror is designated R, which, for a lossless component, would simply be 1- T.

A system including the front and back cavity end mirrors and an active etalon can be modeled as a three-mirrored system with two subcavities. One subcavity contains the active laser material, and the other cavity contains the frequency multiplier, or doubler, chip. The fundamental-frequency flux F in the doubler subcavity is related to the laser output power by the equation:

$$F = \frac{1}{T} P_0 \quad (2)$$

The amount of second-harmonic power $P_2$ produced by the laser is given by the equation:

$$P_2 = F^2 K_s \quad (3)$$

wherein $K_s$ is a constant of the doubler chip material and the geometric configuration of the laser. A reasonable value of constant $K_s$ would be 0.000125.

The laser can be analyzed by treating the entire doubler subcavity as one end reflector of a simpler two-reflector fundamental laser. The fractional reflectivity and transmission of the doubler subcavity is given by equations:

$$I_r = \left( \frac{\alpha(\sqrt{R_2} - \sqrt{R_1})}{1 - \alpha \sqrt{R_1 R_2}} \right)^2 \quad (4)$$

$$I_t = \frac{\alpha(1-R_1)(1-R_2)}{(1-\alpha\sqrt{R_1 R_2})^2} \quad (5)$$

wherein (1-α) is the fractional loss due to non-linear conversion and absorption in the doubler subcavity, $R_2$ is the reflectivity of the front cavity end mirror ($R_2$=1-T), and $R_1$ is the reflectivity of the central mirror of the system (the etalon end mirror of the active etalon).

For this system, however, α is a nonlinear loss, dependent upon the flux in the doubler subcavity. Assuming that the linear loss in the doubler subcavity is much less than the nonlinear loss, e is given by the equation:

$$\alpha = 1 - K_s F \quad (6)$$

There is, therefore, an optimum reflectivity for the etalon end mirror which optimizes the fundamental active etalon output and, thus the harmonic laser power.

Figure 2:
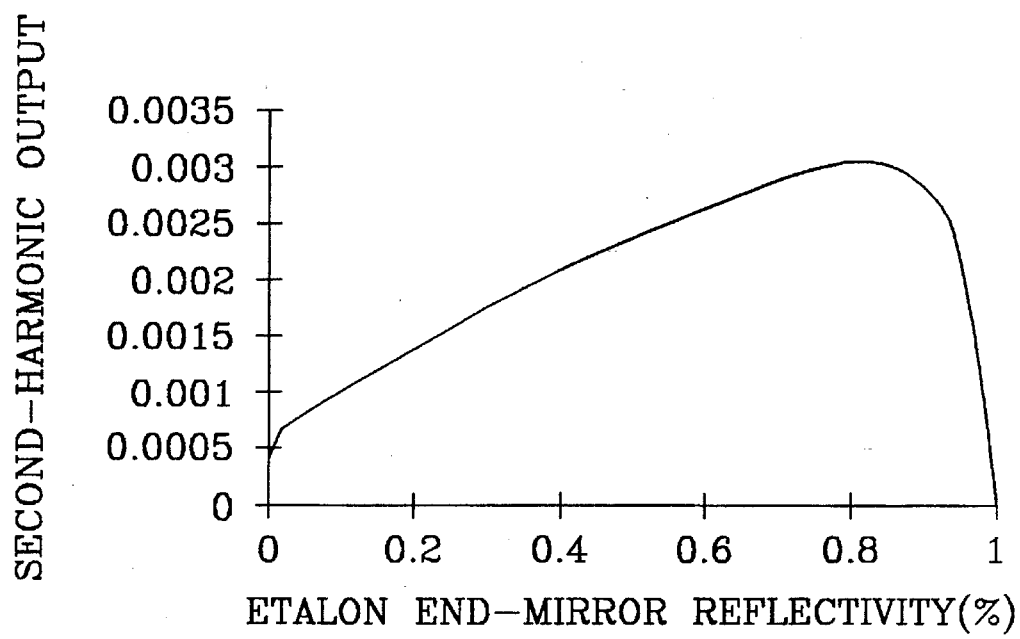
FIG. 2 is a graphical representation of the relationship between the reflectivity of the etalon end mirror and the second harmonic light output of the laser shown in FIG. 1.

FIG. 2 shows an exemplary graphical representation of the relationship between the reflectivity of the etalon end mirror and the second harmonic light output of a frequency-doubled laser. In producing the graph, typical values for the variables in equation (1) were initially chosen. These values were $g_o$=11, $I_s A$=0.0339, $L_i$=0.005 and T=0.0005. The constant $K_s$ was set at 0.000125. The graph was then constructed by calculating the second harmonic output power from equations (1) and (3), substituting $I_r$ for R in equation (1) and varying the reflectivity $R_1$ of the etalon end mirror from 0 to 1. As can be seen, a value of about 0.82 for the etalon end mirror reflectivity $R_1$ produces the greatest second harmonic output power.

Figure 3:
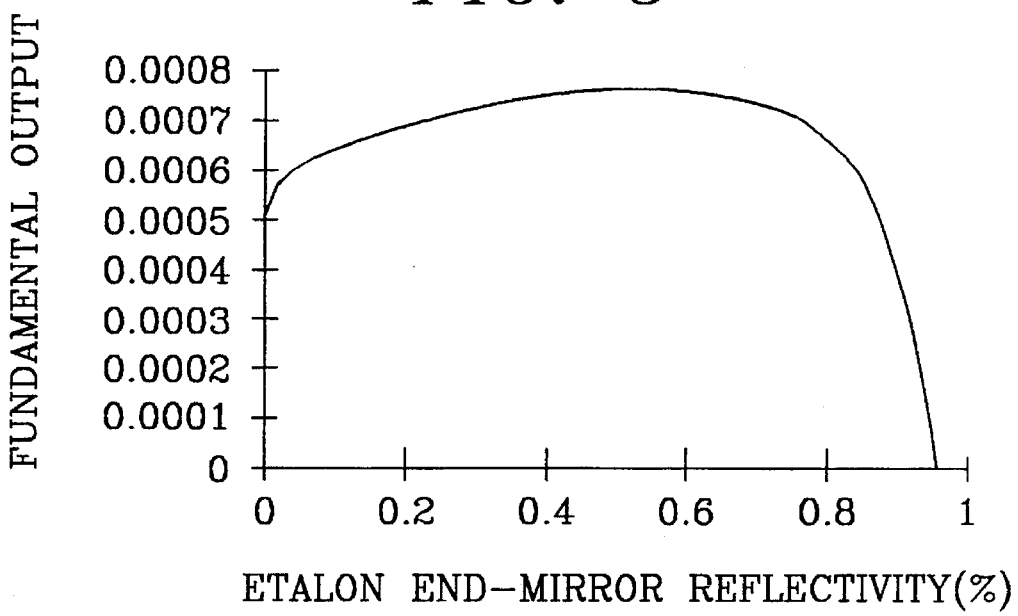
FIG. 3 is an exemplary graphical representation of the relationship between the etalon end mirror reflectivity and the fundamental laser light emitted from the active etalon

The relationship between the etalon end mirror reflectivity $R_1$ and the fundamental laser light emitted from the active etalon is graphically shown in FIG. 3. This graph was produced by fixing the internal loss in the doubler subcavity at α=0.025 and again varying the etalon end mirror reflectivity $R_1$ from 0 to 1. As seen in FIG. 3, the optimum etalon end mirror reflectivity $R_1$ is approximately 0.54.

Having thus described the invention in detail by way of reference to preferred embodiments thereof, it will be apparent that other modifications and variations are possible without departing from the scope of the invention defined in the appended claims.

What is claimed is:

1. A solid-state laser for generating a laser beam comprising:

a laser cavity assembly for defining a laser cavity including a mirrored surface forming a front end of said laser cavity;

a pump source for generating pump radiation and for transmitting said pump radiation into said laser cavity;

a laser gain chip positioned in said laser cavity for generating fundamental laser light in response to said pump radiation;

an input reflector positioned adjacent said laser gain chip for receiving said pump radiation, for transmitting said pump radiation into said laser gain chip and for reflecting said fundamental laser light into said laser gain chip;

an output reflector positioned adjacent said laser gain chip for reflecting a portion of said fundamental laser light into said laser gain chip and for transmitting the remaining portion of said fundamental laser light; and a frequency multiplier for changing the frequency of said fundamental laser light which is transmitted through said output reflector to produce harmonic laser light, a portion of said harmonic laser light passing through said mirrored surface to form said laser beam, wherein said laser gain chip, said input reflector and said output reflector form an active etalon which provides for improved frequency filtering and improved frequency and polarization stability.

2. The laser as recited in claim 1 wherein said frequency multiplier is a frequency doubler chip for doubling the frequency of said fundamental laser light.

3. The laser as recited in claim 2 wherein said frequency doubler chip is formed of potassium titanyl phosphate.

4. The laser as recited in claim 1 wherein said output reflector is separated by a small distance from said laser gain chip.

5. The laser as recited in claim 1 wherein said output reflector is separated from said laser gain chip by a substantially transparent material.

6. The laser as recited in claim 1 wherein said output reflector is operatively adapted for reflecting enough of said fundamental laser light into said laser gain chip to optimize the harmonic laser power of said laser.

7. The laser as recited in claim 1 wherein said input reflector is a separate and discrete element separated from said laser gain chip by a small distance.

8. The laser as recited in claim 7 wherein said substantially transparent material is glass.

9. The laser as recited in claim 1 wherein said input reflector is a separate and discrete element separated from said laser gain chip by a substantially transparent material.

10. The laser as recited in claim 1 wherein said output reflector is adapted for reflecting said pump radiation into said laser gain chip.

11. A method for generating laser light comprising the steps of:

generating pump radiation;

passing said pump radiation through an input mirror into a laser gain chip, said laser gain chip being positioned adjacent said input mirror;

emitting fundamental laser light from said laser gain chip in response to said pump radiation;

reflecting said fundamental laser light into said laser gain chip by means of said input mirror;

reflecting a portion of said fundamental laser light into said laser gain chip by means of an etalot end mirror;

passing the remaining portion of said fundamental laser light through said etalot end mirror, wherein said laser gain chip, said input mirror and said etalon end mirror form an active etalon which provides for improved frequency filtering and improved frequency and polarization stability; and doubling the frequency of said fundamental laser light which passes through said etalon end mirror by means of a frequency doubler chip to produce harmonic laser light.

12. The method as recited in claim 11 comprising the step of passing said harmonic laser light through a cavity end mirror.

13. The method as recited in claim 11 comprising the steps of:

passing a portion of said harmonic laser light through a cavity end mirror; and reflecting the remaining portion of said harmonic laser light from said cavity end mirror.

14. The method as recited in claim 11 wherein the step of reflecting a portion of said fundamental light includes reflecting a portion of said fundamental laser light into said laser gain chip by means of an etalon end mirror which is a separate and distinct element from said laser gain chip and positioned adjacent to said laser gain chip.

15. The method as recited in claim 11 wherein the step of reflecting a portion of said fundamental light includes reflecting a portion of said fundamental laser light into said laser gain chip by means of an etalot end mirror which is separated from said laser gain chip by a small distance.

16. The method as recited in claim 11 wherein the step of reflecting a portion of said fundamental light includes reflecting a portion of said fundamental laser light into said laser gain chip by means of an etalot end mirror which is separated from said laser gain chip by a substantially transparent material.

* * * * *